US007046890B2

(12) United States Patent
Sparks

(10) Patent No.: US 7,046,890 B2
(45) Date of Patent: May 16, 2006

(54) OPTICAL FIBER WITH LOW TAPER INDUCED LOSS

(75) Inventor: Kevin B Sparks, Corning, NY (US)

(73) Assignee: Corning Incorporated, Corning, NY (US)

( * ) Notice: Subject to any disclaimer, the term of this patent is extended or adjusted under 35 U.S.C. 154(b) by 282 days.

(21) Appl. No.: 10/676,353

(22) Filed: Sep. 30, 2003

(65) Prior Publication Data

US 2005/0069271 A1   Mar. 31, 2005

(51) Int. Cl.
*G02B 6/036* (2006.01)
(52) U.S. Cl. .................. 385/127; 385/123; 385/126
(58) Field of Classification Search ......... 385/123–127
See application file for complete search history.

(56) References Cited

U.S. PATENT DOCUMENTS 5,295,211 A    3/1994  Weidman
5,412,745 A    5/1995  Weidman et al.
5,761,366 A  * 6/1998  Oh et al. .................... 385/127
5,822,488 A  * 10/1998 Terasawa et al. ........... 385/127
6,205,279 B1   3/2001  Kim et al. ................... 385/127

FOREIGN PATENT DOCUMENTS

EP    0578982    1/1994
EP    1046937    10/2000

* cited by examiner

*Primary Examiner*—Jennifer Doan
(74) *Attorney, Agent, or Firm*—Svetlana Z. Short

(57) ABSTRACT

An optical fiber comprising: (i) a central core having a relative refractive index delta $\Delta_C$; (ii) a multi-pedestal region in contact with and surrounding the core, said multi-pedestal region having an outer radius of less than 25 μm and at least two pedestals, each of the pedestals being in contact and adjacent to at least one other pedestal, each of the pedestals having a relative refractive index $\Delta_{ped}$ lower than $\Delta_C$, at least one of the pedestals having $\Delta_{ped}$ value higher than 0.2%; and (iii) another region in contact and surrounding the multi-pedestal region, the other region having a relative refractive index delta which is lower than that of any pedestal.

20 Claims, 8 Drawing Sheets

OPTICAL FIBER WITH LOW TAPER INDUCED LOSS

BACKGROUND OF THE INVENTION

1. Field of the Invention

The present invention relates generally to tapered optical fibers and is particularly applicable to optical fibers for use in optical couplers that have low values of nonadiabatic-taper-induced loss.

2. Technical Background

Tapered or heat-treated optical fibers are utilized in fiber pigtails, optical couplers, splicing, connectors and other optical components. As the preformance requirements for the optical components become ever more stringent, the need to eliminate excess loss becomes more critical. One contributor to excess loss is non-adiabatic taper-induced loss.

In the tapered regions of fibers the fundamental mode is continuously changing shape to accommodate the changing local index profile. If the rate of change in geometry is too great, the fundamental mode can be coupled to the higher order modes. This mechanism is referred to as a non-adiabatic modal coupling.

When the optical fiber is heated, the dopant materials diffuse, changing the local refractive index profile. This occurs, for example, for example, during the splicing process, or during the manufacture of optical coupler devices. If the rate of change of refractive index (along the length of the fiber) is relatively large, the fundamental mode can be coupled to the higher order modes, resulting in a nonadiabatic index coupling.

The relative refractive index ($\Delta\%$) profile (idealized) of a typical telecommunication fiber is illustrated schematically in FIG. 1. FIG. 2 illustrates schematically a fiber profile with a depressed index of refraction in the region between the fiber core and the cladding. When tapered, these types of optical fibers exhibit a relatively large amount of non-adiabatic taper-induced loss. Therefore, optical components that include these optical fibers also suffer from non-adiabatic taper-induced loss. For example, an optical coupler can be fabricated by bringing together two optical fibers and then tapering and fusing them together with an appropriate heat source. However, as the fiber core diameter (in the coupling region) decreases, as compared with the core diameter at the end of each fiber, the coupler exhibits larger amounts of non-adiabatic taper induced loss.

U.S. Pat. No. 5,412,725 discloses a fiber coupler exhibiting a low non-adiabatic-taper induced loss. The fiber in this coupler has a refractive index profile illustrated in FIG. 3. More specifically, the refractive index profile illustrated in FIG. 3 has a refractive index pedestal characterized by an index of refraction that is intermediate the index $n_1$ of the core and refractive index $n_2$ of the cladding. However, as disclosed in col. 6, lines 8 of this reference, the optimal refractive values for the pedestal and pedestal radius were derived without considering such factors as mode field diameter and cutoff wavelength. The presence of a pedestal in the refractive index profile of a fiber results in a different mode field diameter than would be exhibited by a fiber without the pedestal.

SUMMARY OF THE INVENTION

According to one embodiment of the invention is an optical fiber comprising: (i) a central core having a relative refractive index delta $\Delta_C$; (ii) a multi-pedestal region in contact with and surrounding the core, said multi-pedestal region having an outer radius of less than 25 µm and at least two pedestals, each of the pedestals being in contact and adjacent to at least one other pedestal, each of the pedestals having a relative refractive index $\Delta_{ped}$ lower than $\Delta_C$, at least one of the pedestals having $\Delta_{ped}$ value higher than 0.2%; and (iii) another region in contact and surrounding the multi-pedestal region, the other region having a relative refractive index delta which is lower than that of any pedestal. According to one embodiment, this region is cladding and at least one of the pedestals has $\Delta_{ped}$ value lower than 0.2%.

According to another embodiment, the present invention includes an optical fiber comprising: (i) a central core having a relative refractive index delta $\Delta_C$, (ii) a multi-pedestal region surrounding the core, the multi-pedestal region having an outer radius of less than 25 µm and at least two pedestals, at least one of the pedestals having relative refractive index delta value $\Delta_{ped}$ higher than 0.2% and a width less than 6 µm; and (iii) a cladding surrounding the multi-pedestal region. The cladding having a relative refractive index delta lower than that of any pedestal.

One an advantage of the optical fiber of the present invention is that this fiber, when utilized in optical splicing application, maintains adiabatic modal evolution and, therefore, exhibits low splice loss. Another advantage of the optical fiber of the present invention is that this fiber can be utilized to manufacture low loss couplers or other tapered-fiber devices.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present illustrative embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
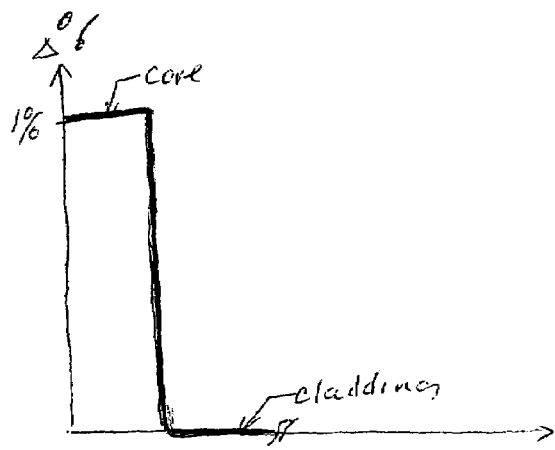
FIG. 1 is a schematic illustration of a relative refractive index profile of a Prior Art optical fiber.
Figure 2:
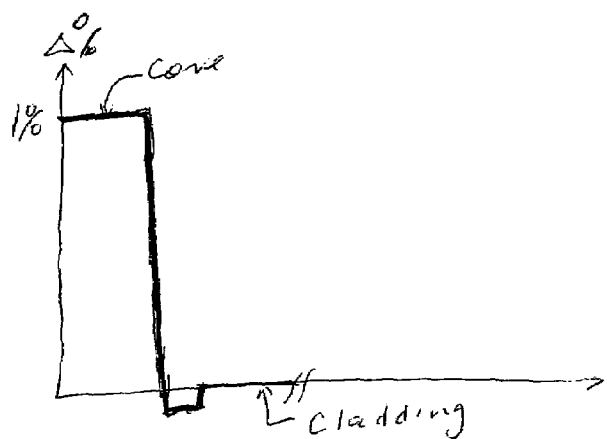
FIG. 2 is a schematic illustration of a relative refractive index profile of second Prior Art optical fiber.
Figure 3:
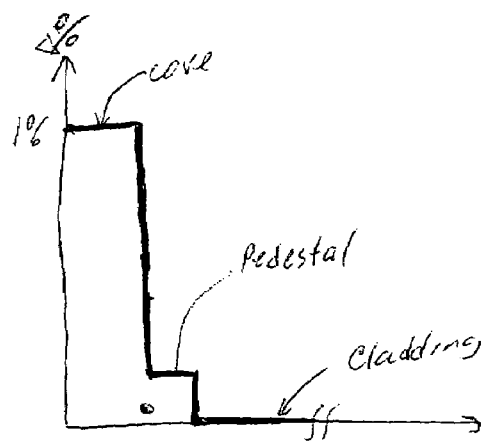
FIG. 3 is a schematic illustration of a relative refractive index profile of another optical fiber.

Reference will now be made in detail to the present preferred embodiments of the invention, examples of which are illustrated in the accompanying drawings. Whenever possible, the same reference numerals will be used throughout the drawings to refer to the same or like parts. An optical fiber of the present invention designated generally throughout by the reference numeral 10. Two illustrative embodiments of the relative refractive index profiles of the optical fiber 10 are shown schematically in FIGS. 4a and 4b.

It is noted that in the relative refractive index profiles depicted in FIGS. 1–3 and 4a, 4b no attempt has been to represent indices and radii to scale and/or exact magnitude.

Figure 4A:
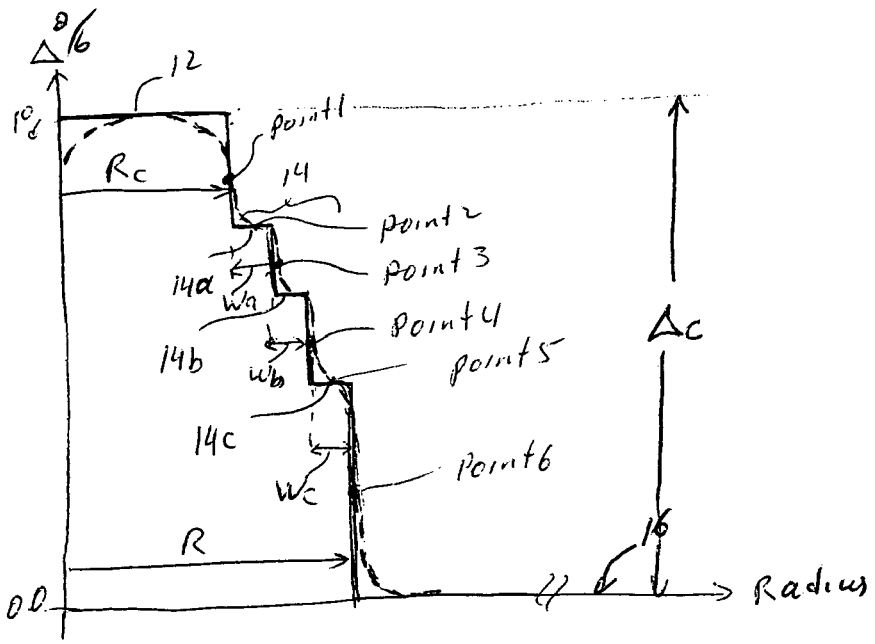
FIGS. 4a and 4b are a schematic illustration of a relative refractive index profile of two illustrative embodiments of the present invention.
Figure 4B:
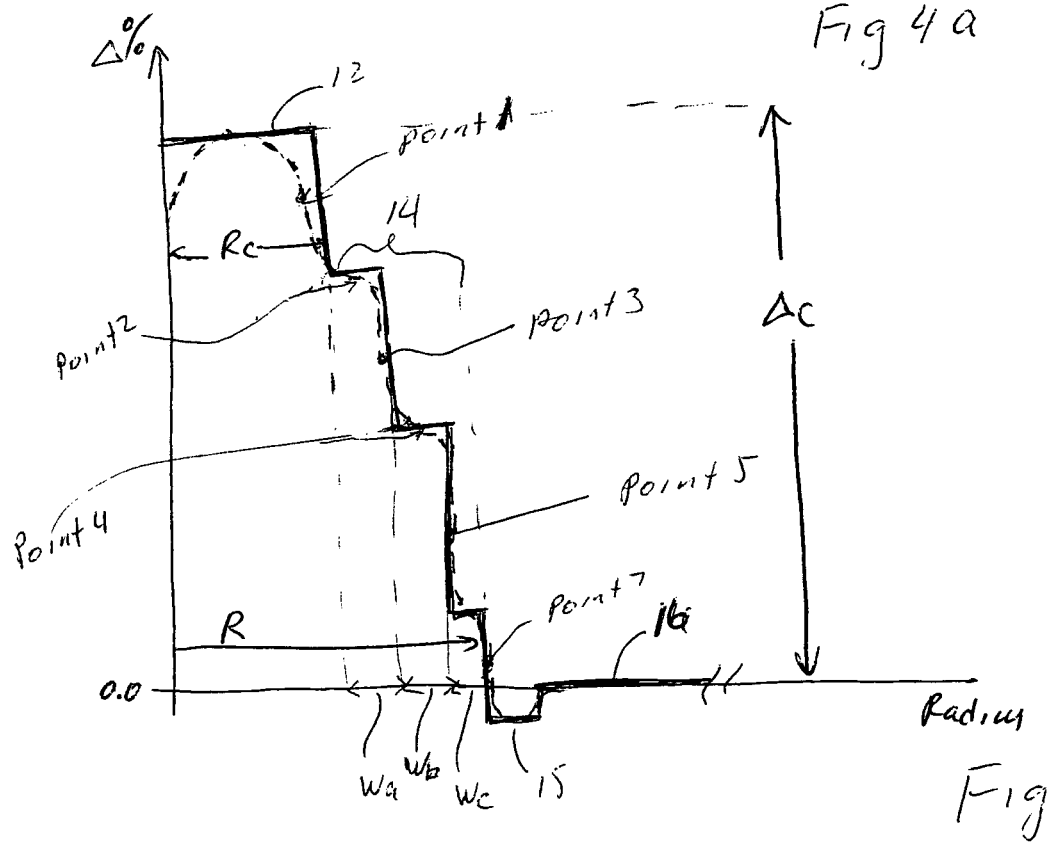

As embodied herein and depicted in the fiber profiles of FIG. 4a, 4b, the optical fiber 10 comprises: (i) a central core 12 having a refractive index $n_C$, (ii) a multi-pedestal region 14 connected to and surrounding the core 12, with at least two pedestals 14a and 14b; and (iii) a cladding 16 surrounding the multi-pedestal region 14. It is preferable that the central core radius Rc be about 5 μm or less, and more preferable that Rc≦2.5 μm. It is most preferable that the radius Rc of the central core be between 0.8 μm and 2.5 μm.

The pedestals are the step-like regions in the relative refractive index profile which indicate progressive refractive index drops within the multi-pedestal region 14 and which are formed by different amounts of index-altering dopant(s). However, although an ideal pedestal has sharp edges, the pedestals may also have rounded or sloped edges as indicated, for example, by the dashed curves of FIGS. 4a, 4b.

The cladding 16 has an index of refraction $n_{Cl}$ which is either lower than the index of refraction of any of the pedestals, or is preceded by a moat 15 (located between the cladding 16 and the-pedestal region 14) with the index of refraction $n_M$ lower than the index of refraction of any of the pedestals. The multi-pedestal region 14 has an outer radius R of less than 25 μm and preferably less than 20 μm. At least one of the pedestals (14a) has $\Delta_{ped}$ value higher than 0.2%. Preferably, another one of the pedestals (14b) has a $\Delta_{ped}$ value lower than 0.2%. The relative refractive index $\Delta_{ped}$ of a pedestal is defined as $(n_i^2-n^2)/2n^2$, where $n_i$ is the refractive index of the specific pedestal 14i and n is the refractive index of the region that is in contact and surrounding the multi-pedestal region 14. That is, n is ether the refractive index of the cladding 16 or the moat 15. For example, $\Delta_{ped}$ of the third pedestal 14c equals to $(n_i^2-n_{Cl}^2)/2n_i^2$, where $n_i$ is a refractive index of the pedestal 14c and $n_{Cl}$ is the refractive index of cladding 16, shown in FIG. 4a. Typically, the cladding 16 is made of pure silica. However, it may include index altering dopants.

It is preferable that the multiple-pedestal region 14 of the optical fiber 10 includes six or fewer pedestals 14i with $\Delta_{ped}$ values higher than 0.2% and the width of each of these pedestals is 6 μm or less. It is even more preferable that the width of each of the pedestals are less 5 μm. It is most preferable that the width Wi of each of the pedestals be in the range of 0.2 μm to 4 μm. The width of the pedestals may be determined by the step function approximation to the curved lines. For example, the widths of the pedestals may be determined by inflection points on the plot of the relative refractive index profile. For example, the radius of the core 12 may be measured as the horizontal distance from the vertical axis to the first point of inflection (not accounting for the centerline dip). The radius of the first pedestal 14a may be determined by the third point of inflection and the width $W_a$ of this pedestal may be measured by the horizontal distance between the first and the third point of inflection. The radius of the third pedestal may be determined by the third point of inflection and the width $W_b$ of the second pedestal 14b would then correspond to the distance between the third and the fifth line of inflection. That is, if the relative refractive index profile is similar to that shown by the dashed lines of FIGS. 4a and 4b, the widths of the pedestals may be determined by the distances between the odd inflection points.

It is most preferable that the total width of these pedestals with $\Delta_{ped}$ values higher than 0.2% is less than 15 μm. It is also preferable that at least one of these pedestals has $\Delta_{ped}$ values higher than 0.3% and lower than 0.9%,; more preferably higher than 0.3% and lower than 0.7%.

The multiple pedestal region 14 modifies the spacing of the propagation constant of the guided mode (also referred to as the fundamental mode) and that of the higher mode(s) (such as $LP_{02}$, $LP_{11}$, for example) of the optical fiber 10. The propagation constant of the guided mode is approximated by the $LP_{01}$ scalar mode. The propagation constant of the higher mode is approximated by the $LP_{02}$ scalar mode. Applicant believes that if coupling from the guided mode $LP_{01}$ to the higher $LP_{02}$ mode is minimized, then coupling from the $LP_{01}$ to the other higher modes will also be minimized.

A single mode optical fiber will support low-loss propagation of the guided mode $LP_{01}$ and will strip off light propagating in the higher order modes. Thus, coupling of signal light from the guided mode into a higher order mode is undesirable, because this signal light will be lost. However, when the spacing between $LP_{01}$ and $LP_{02}$ modes is small, light tends to couple between the guided and the higher order mode(s).

Increasing this spacing between the guided mode and the higher order modes ($LP_{01}$–$LP_{02}$, at the desired wavelength λ), by addition of the multi-pedestal region 14, reduces the coupling between the guided mode and the higher order mode(s). As stated above, optical fiber 10 is a single mode fiber and reducing the coupling between the guided mode (LP01) and the higher order mode(s) reduces excess loss and improves fiber efficiency.

Therefore, increasing the spacing between the $LP_{01}$ and $LP_{02}$ modes in the optical fiber 10 will reduce excess loss for the optical fibers with the same taper geometry. Alternatively, greater spacing between the modes will allow the same loss with steeper tapers, enabling fabrication of more compact (i.e. shorter) devices. It is preferable that the spacing between these two modes ($LP_{01}$–$LP_{02}$), at λ=1550 nm be larger than 0.0019 μm$^{-1}$, which is achieved by the presence of the multi-pedestal region 14. In the disclosed illustrative embodiments this spacing is between 0.0019 μm$^{-1}$ and 0.003 μm$^{-1}$. This spacing resulted in non-adiabatic taper induced loss of less than 0.1 dB when the fiber taper ratio was in the range of 1.5 and 3. In some embodiments the non-adiabatic taper induced loss was below 0.06 and 0.05 dB.

Applicant discovered, that unless specifically controlled, introduction of a multiple pedestal region into a fiber changes fiber's MFD and its cut-off wavelength λc, often changing fiber from a single mode to a multi-mode fiber and resulting in loss of MFD match with other fibers for packaging and pigtailing and, in addition, increases fiber's bend loss sensitivity. More specifically, as the MFD value (at the specified wavelength, for example 1550 nm) of the optical fiber increases, the bend loss of the optical fiber goes up. Thus, the height and the width of the pedestals should be varied to keep the fallowing two variables substantially constant: (i) the MFD diameter (at the specified wavelength), and (ii) the cut-off wavelength $\lambda c$.

More specifically, to design a multiple-pedestal fiber 10, applicant used, as a starting point, relative refractive index profile of a typical Si/Ge doped fiber without the pedestal region. The amount of germanium in the core region was 18 wt %, resulting in $\Delta\%=1\%$. The fiber's cladding was pure Si cladding. Then the first pedestal (at index delta about $\Delta\% =0.75\pm0.15$) was added next to the core region, which changed values for both MFD and $\lambda c$. The width of the pedestal was then scaled down to bring $\lambda c$ to below 980 nm (preferably to 965 nm$\pm$10 nm). Then the applicant scaled (either up or down), by about 10% increments both the core and the pedestal diameter to attain the target MFD diameter (7 $\mu$m, at $\lambda=1550$ nm). This step was repeated, if necessary, with a different increment amount, until the desired MFD and $\lambda c$ were attained. Subsequently, applicant added the next pedestal which again changed values for both MFD and $\lambda c$. The difference in index delta between the first and the second pedestal was chosen to be at about 0.1% or larger. The width of the next pedestal was then scaled down to bring $\lambda c$ to its target value (preferably to 965 nm$\pm$10 nm). Then the width of both the core and the multi-pedestal region was scaled (either up or down), by about 10% increments to attain the target MFD diameter. The applicant added other pedestals to the pedestal region and preformed the above described scaling steps with the addition of each pedestal. The difference in index delta between the different pedestals is variable, depending on the number of pedestals in the multi-pedestal region 14. It is preferable that the difference in index delta between the different pedestals be about 0.05% or larger.

In the disclosed embodiments of the optical fiber 10 the height and the width of the pedestals was controlled by choosing the proper amount of the index raising dopant. Although in the disclosed embodiment the index raising dopant is Ge, other index raising dopants may also be utilized. More specifically, a standard silica based all core cane( Si/18% wt Ge), may be overclad with Silica/Germania during laydown, for example by an outside vapor deposition OVD processing technique. OVD processing is well known to those of ordinary skill in the art of optical fiber manufacturing, and, therefore, will not be discussed herein. Alternatively, dopants such as boron or fluorine may be utilized to depress the index of the pedestals relatively to one another.

It is preferable, in order to minimize bend losses, that the fiber's MFD be below 8 $\mu$m (at $\lambda=1550$ nm). On the other hand, as the MFD decreases, the cut-off wavelength starts to increase and increases rapidly when the fiber MFD is below 6.2 $\mu$m (at $\lambda=1550$ nm). In the followings illustrative embodiments the optical fiber 10 has mode field diameter MFD between 6 $\mu$m and 8 $\mu$m (at $\lambda=1550$ nm) and a cut-off wavelength $\lambda c=980$ $\mu$m or less (measured at 2 m fiber cut-off). It is preferable that MFD values be in the range of 6.2 $\mu$m and 7.7 $\mu$m (at $\lambda=1550$ nm), and most preferable that MFD values be in the range of between 6.5 $\mu$m and 7.5 $\mu$m (at $\lambda=1550$ nm).

Figure 5:
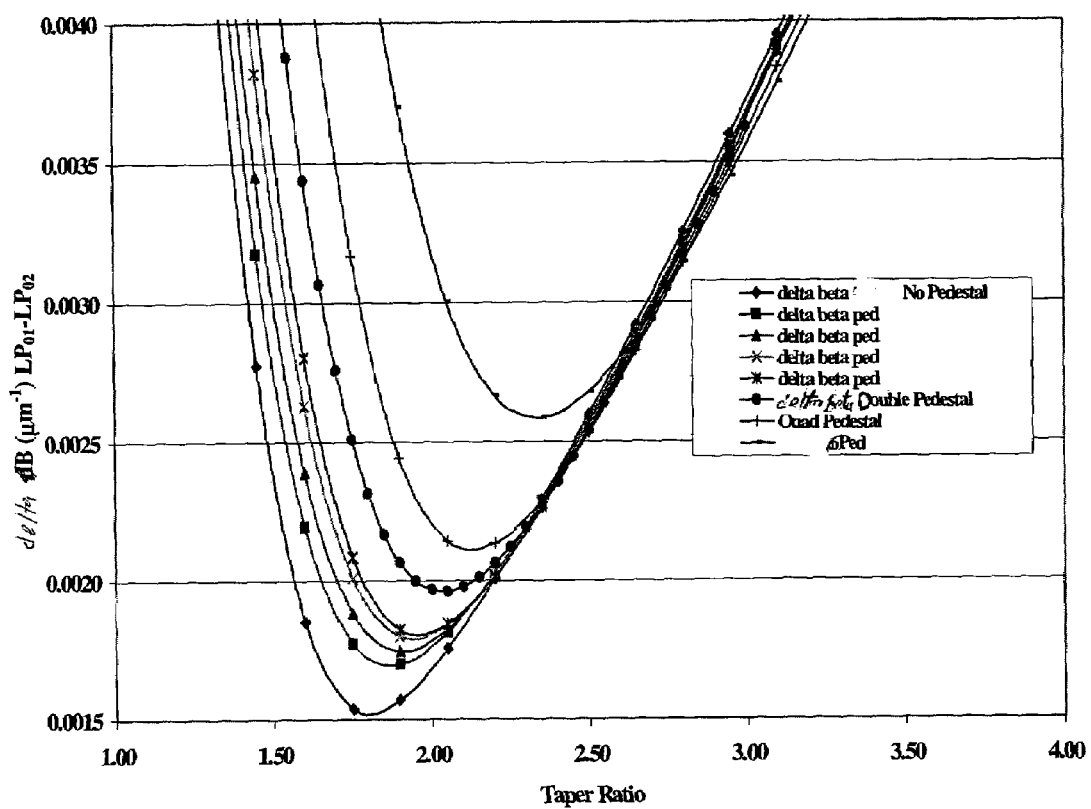
FIG. 5 illustrates differences in spacing between the $LP_{01}$ mode and the $LP_{02}$ mode versus the fiber taper ratio, for several fibers with different pedestal region geometry.

FIG. 5 depicts the differences in spacing between the $LP_{01}$ mode and the $LP_{02}$ mode versus the fiber taper ratio for several fibers with different pedestal region geometry. The core size and the core and the cladding compositions of these fibers were identical and the geometry of the pedestals were modified to keep (i) MFD below 8 $\mu$m at a wavelength of 1550 nm and approximately constant; and (ii) the cutoff wavelength at or below 980 nm. In the disclosed embodiments MFD values were targeted to be MFD=7 $\mu$m$\pm$0.25 $\mu$m (at a wavelength of 1550 nm), and the cut off wavelength was targeted to be $\lambda c=965$ nm, $\pm$10 nm.

The excess loss value L is inversely proportional to delta $\beta$, or ($LP_{01}-LP_{02}$). Thus, FIG. 5 is a graph of inverse Loss $\mu m^{-1}$ versus fiber taper ratio. It illustrates that the highest loss (minimum delta $\beta$) occurs for taper ratios between 1.4 and 2.6, with the majority of fibers having highest loss when the taper ratio is between 1.6 and 2.4. The taper ratio is the ratio between fiber diameter at non-tapered region and fiber diameter at the narrowest (tapered) region. That is, it is the ratio of initial fiber core diameter to the final fiber core diameter, after the fiber has been tapered.

FIG. 5 illustrates that a fiber with no pedestal region suffers from most loss (bottom-most curve). The next four curves correspond to the optical fibers with a single pedestal. FIG. 5 shows that fibers with a single pedestal in the pedestal region preforms better than the fiber with no pedestals. The four curves correspond to optical fibers with progressively higher pedestals. The heights of the single pedestals range from 0.016%, to 0.04%. The best results (least loss) was achieved with the higher pedestal (delta of 0.04%). However, we obtain no loss improvement when the height of the single pedestal was increased above this amount.

The next three curves (from the bottom) of FIG. 5 correspond to the fibers with a two pedestal, four pedestal and six pedestal regions. As stated above the dimensions of the pedestals were chosen to maintain MFD and the cut-off wavelength $\lambda c$. FIG. 5 illustrates that propagation constant difference progressively increased (i.e., taper-induced loss progressively decreased) as the number of pedestals increased from 1 to 6. However, as the number of pedestals increases, the difficulty in making the optical fiber also increases. This is illustrated in FIG. 6.

Figure 6:
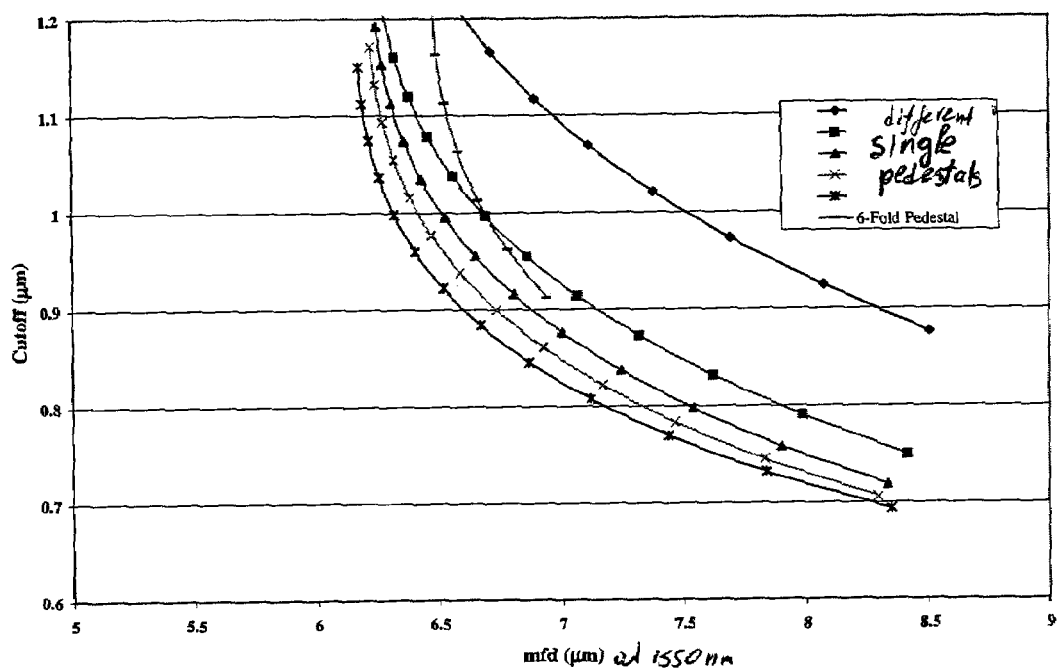
FIG. 6 illustrates MFD versus cut-off wavelength for a fiber with a single pedestal and an illustrative fiber of the present invention that includes six pedestals.

More specifically, FIG. 6 illustrates MFD versus cut-off wavelength for a fiber with a single pedestal and a fiber with six pedestals. The curve corresponding to the six-pedestal fiber design is much steeper than the curve corresponding to the single pedestal fiber design. This signifies an increased sensitivity of cut-off wavelength to small changes in fiber's core diameter. Thus, in order to decrease the sensitivity of the cut-off wavelength to small changes in fiber core diameter (and, as result, increasing manufacturing yields), it is preferable that optical fiber 10 has two to four pedestals.

EXAMPLES

The invention will be further clarified by the following examples of the optical fibers containing 2, 4 and 6 pedestals in the pedestal region 14. Although in these examples the core-to-cladding delta is 1%, the relative refractive index difference between the core and the cladding may be larger or smaller.

Example 1

Figure 7:
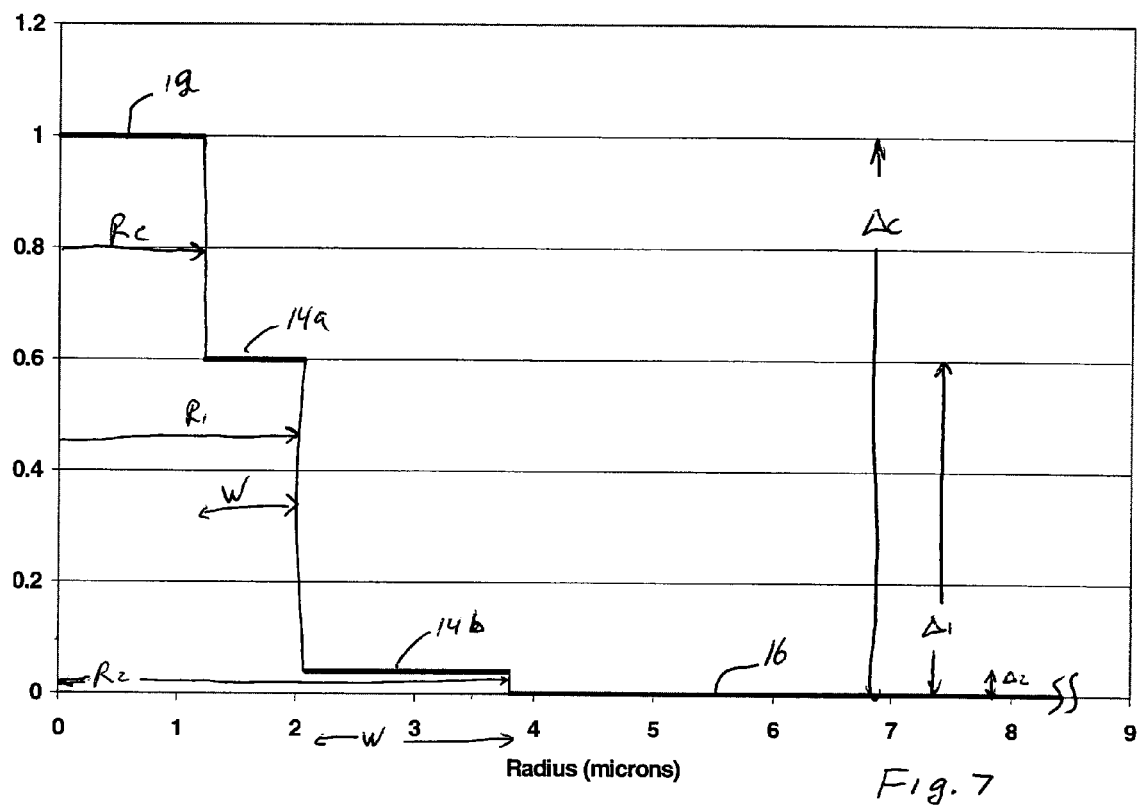
FIG. 7 illustrates a relative refractive index profile of an optical fiber that has a pedestal region with two pedestals surrounding the fiber core.

FIG. 7 illustrates a relative refractive index profile of an optical fiber 10 that has a central core region 14 with two pedestals 14a, 14b surrounding the central core 12. The fiber's central core radius Rc is about 1.25 µm. Pedestal 14a is characterized by the relative index delta $\Delta_1$ of 0.6% and is about 0.8 µm wide. The outer radius $R_1$ of the first pedestal 14a is about 2 µm. Pedestal 14b is characterized by the index delta $\Delta_2$ of about 0.04% and is about 1.6 µm wide. The outer radius $R_2$ of the second pedestal 14a is about 3.8 µm. The total width of the pedestal region 14 is about 2.5 µm and its outer radius is about 3.8 µm (R=$R_2$). The core of the fiber contains about 18 wt % Ge, while the pedestal regions 14a, 14b contain about 11 wt % and 0.7% wt Ge, respectively.

Example 2

Figure 8:
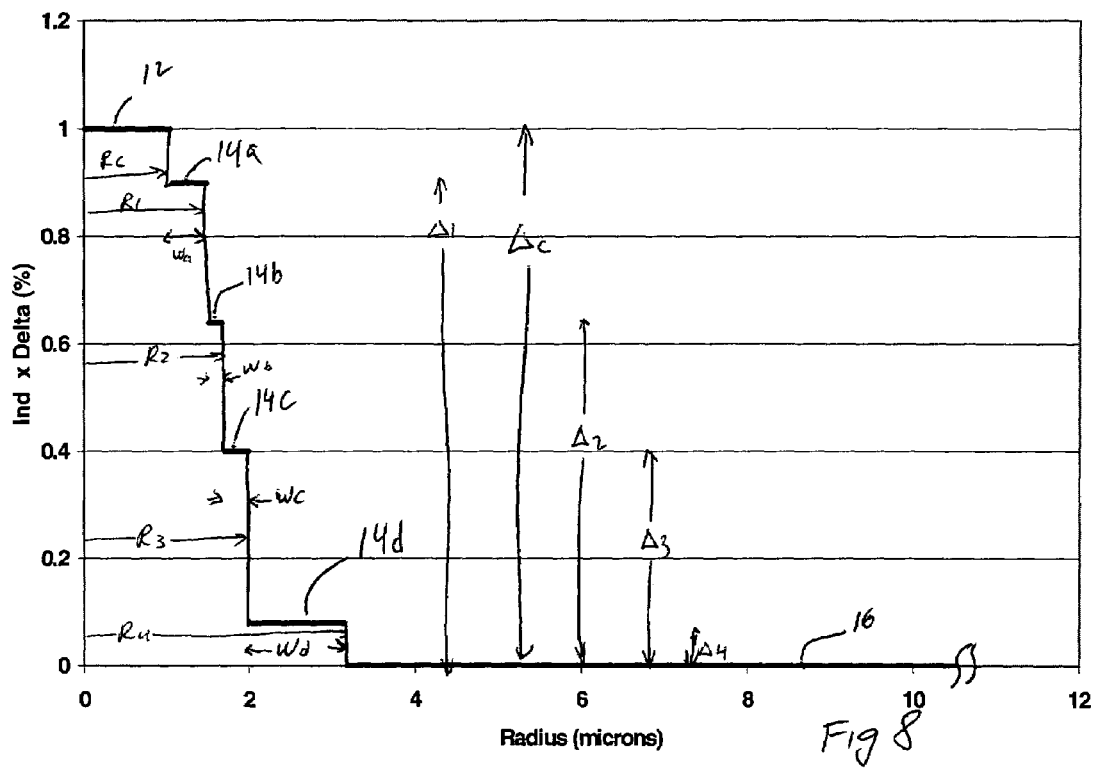
FIG. 8 illustrates a relative refractive index profile of an optical fiber that has a pedestal region containing four pedestals.

FIG. 8 illustrates a relative refractive index profile of an optical fiber 10 that has a central core region 14 with four pedestals 14a, 14b, 14c and 14d surrounding the central core 12. The fiber's central core radius Rc is about 1 µm. Pedestal 14a is characterized by the index delta $\Delta_1$ of about 0.9% and is about 0.5 µm wide. The outer radius $R_1$ of the first pedestal 14a is about 1.5 µm. Pedestal 14b is characterized by the index delta $\Delta_2$ of 0.64% and is about 0.2 µm wide. The outer radius $R_2$ of the second pedestal 14b is about 1.7 µm. Pedestal 14c is characterized by the index delta $\Delta_3$ of about 0.4% and is about 0.3 µm wide. The outer radius $R_3$ of the third pedestal 14c is about 2 µm. Pedestal 14d is characterized by the index delta $\Delta_4$ of about 0.08% and is about 1.2 µm wide. The outer radius $R_4$ of the fourth pedestal 14d is about 3.2 µm. Thus, the total width of the pedestal region 14 is about 2.5 µm and it outer radius is about 3.2 µm. The core of the fiber contains about 18 wt % Ge, while the pedestal regions 14a, 14b, 14c and 14d contain about 16 wt %, 11.5 wt %, 7 wt % and 1.5% wt of Ge, respectively.

Example 3

Figure 9:
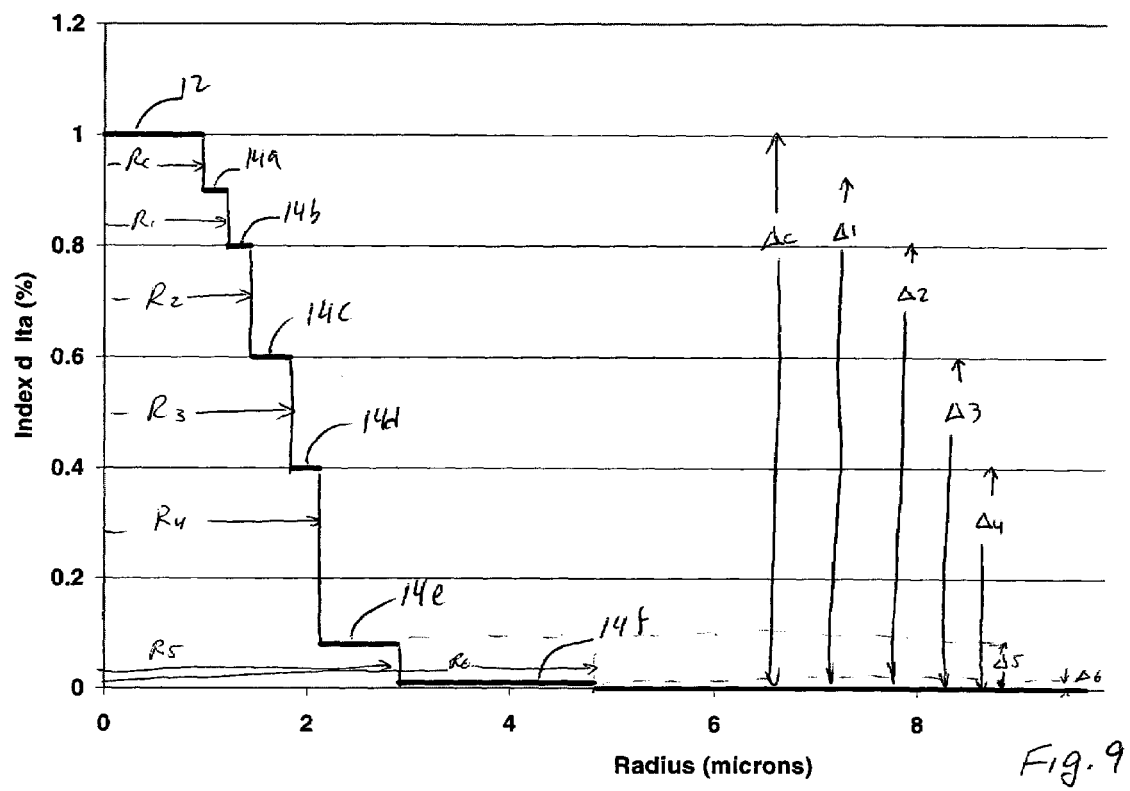
FIG. 9 illustrates a relative refractive index profile of an optical fiber that has a pedestal region containing six pedestals.

FIG. 9 illustrates a relative refractive index profile of an optical fiber 10 that has a core region 14 with six pedestals 14a, 14b, 14c, 14d, 14e and 14f surrounding the core 12. The fiber's central core radius Rc is about 0.9 µm. Pedestal 14a is characterized by the index delta $\Delta_1$ of about 0.9% and is about 0.3 µm wide. Pedestal 14b is characterized by the index delta $\Delta_2$ of 0.8% and is about 0.3 µm wide. Pedestal 14c is characterized by the index delta $\Delta_3$ of about 0.6% and is 0.4 µm wide. Pedestal 14d is characterized by the index delta $\Delta_4$ of 0.4% and is 0.3 µm wide. Pedestal 14e is characterized by the index delta $\Delta_5$ of 0.09% and is about 0.7 µm wide. Pedestal 14f is characterized by the index delta $\Delta_6$ of 0.02% and is 2 µm wide. The total width of the pedestal region 14 is 4 µm and it outer radius is about 5 µm. The central core of the fiber contains about 18% Ge, while the pedestals 14a–14e contain progressively lower amounts of Ge. Pedestal 14f contains about 2 wt % chlorine Cl, and no Ge.

The optical fiber 10 can be manufactured by the process similar to the one described, for example, in U.S. Pat. No. 5,295,211. More specifically, Ge and $SiO_2$ are supplied (in vapor form) and deposited on a mandrel. After the central core region is deposited, Ge gas flows are reduced (to provide lower level of Ge) for the first pedestal, and further reduced in successive pedestals. The mandrel is removed and the resultant tubular (core/pedestal) preform is gradually inserted into a consolidation furnace muffle, at the temperature of about 1500° C. (1200° C.–1700° C.) for high silica content glass.

Chlorine gas (which is normally present during the preform consolidation step to achieve drying) may be supplied into the preform aperture as a drying gas during consolidation. A helium flushing gas is simultaneously flowed through the muffle.

The resultant tubular article is heated and drawn in a standard draw furnace while a vacuum is applied to the aperture to form a "core/pedestal rod" in which the aperture has been closed. A suitable length of rod is supported in a lathe where particles of silica are deposited thereon. The resultant final porous preform is inserted into a consolidation furnace where it consolidated while a mixture of chlorine and helium is flowed upwardly through the furnace. The resultant glass preform is overclad with, for example, ure silica to produce a fiber preform, which is then, drawn to form a single mode optical fiber.

The amount of Ge applied to the core/pedestal preform determines the radius of the pedestal region 14 and the heights ($\Delta_{pd}$) of the pedestals 14i. In absence of other index effecting dopants addition of 18 wt % of Ge to pure silica corresponds to the relative refractive index delta of about 1%, and the effect of adding Ge dopant is linear. If chlorine has been added, the amount of chlorine to which the porous portion of the preform is subjected to during second drying/consolidation step will also effect (increase) the value of $\Delta_{ped}$.

Figure 10:
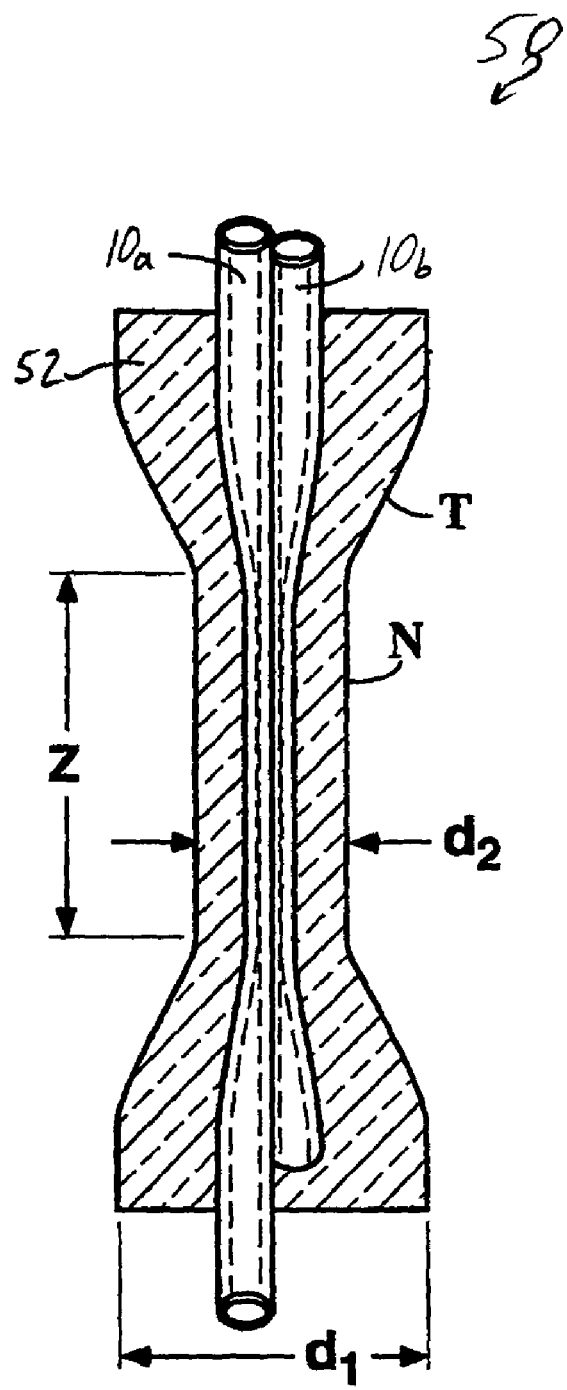
FIG. 10 illustrates schematically an optical coupler that includes an optical fiber of the present invention.

The resultant optical fiber 10 may be tapered to produce a low-loss optical coupler 50. Such an optical coupler is illustrated schematically in FIG. 10. Coupler 50 includes two single mode optical fibers 10a, 10b, which can be situated within the overclad tube 52. At least one and preferably both of these fibers include the multi-pedestal region 14 situated between the core 12 and another region (cladding 16 or moat 15). The original diameter of the tube is $d_1$. The central portion of the stretched mid-region constitutes neckdown region N of diameter $d_2$ where the fiber cores are sufficiently closely spaced for a sufficiently long distance Z to effect the desired coupling therebetween. Region N is illustrated as having a constant diameter even though a slight taper exists therein, whereby the longitudinal center of section N exhibits minimum diameter. Fiber taper ratio is approximately the draw ratio $d_1/d_2$. Tapered regions T connect the neckdown region with the unstretched end regions of the overclad tube 52. Alternatively, the two fibers may be placed in proximity with one another, heated and tapered, without the overclad tube 52. The coupler fibers 10a, 10b would have taper ratio between 1.5 and 4.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
    a central core having a relative refractive index delta $\Delta_C$,
    a multi-pedestal region in contact with and surrounding said core, said multi-pedestal region having an outer radius of less than 25 µm and at least two pedestals, each of said pedestals being in contact with and adjacent to at least one other pedestal, each of said pedestals having a relative refractive index delta $\Delta_{ped}$ lower than $\Delta_C$, at least one of said pedestals having $\Delta_{ped}$ value higher than 0.2% and a width of less than 6 µm and another one of said pedestals having $\Delta_{ped}$ value lower than 0.2%; and another region in contact and surrounding said multi-pedestal region, said another region having relative refractive index delta which is lower than that of any pedestal.

2. The optical fiber according to claim 1, wherein said another region is cladding, said cladding having an index of refraction $n_{Cl}$ which is lower than that of any pedestal.

3. The optical fiber according to claim 2, wherein said multiple-pedestal region includes 5 or fewer pedestals with $\Delta_{ped}$ values higher than 0.2% and the widths of the pedestals is 6 μm or less.

4. The optical fiber according to claim 3, wherein the index of refraction and $\Delta_{ped}$, of each of said pedestals in said pedestal region, is lower than that of the preceding pedestal.

5. The optical fiber according to claim 3, wherein the widths of these pedestals is 0.2 μm to 5 μm.

6. The optical fiber according to claim 1, wherein said fiber has mode field diameter MFD between 6 μm and 8 μm at 1550 nm and a cut-off wavelength $\lambda \leq 980$ μm.

7. The optical fiber according to claim 1, wherein at least one of said pedestals has $\Delta_{ped}$ value higher than 0.3% and lower than 0.7%.

8. An optical fiber comprising:
a central core having a relative refractive index delta $\Delta_C$,
a multi-pedestal region surrounding said core, said multi-pedestal region having an outer radius of less than 25 μm, said region having at least two pedestals, at least one of said pedestals having $\Delta_{ped}$ value higher than 0.2% and lower than $\Delta_C$ and a width less than 6 μm, and wherein said multiple-pedestal region includes 6 or fewer pedestals with $\Delta_{ped}$ values higher than 0.2% and the widths of each of these pedestals with $\Delta_{ped}$ values higher than 0.2% is less than 5 μm; and
another region in contact and surrounding said multi-pedestal region, said another region having a relative refractive index delta lower than that of any pedestal.

9. The optical fiber according to claim 8, wherein said multiple-pedestal region includes 5 or fewer pedestals with $\Delta_{ped}$ values higher than 0.2% and the widths of each of these pedestals with $\Delta_{ped}$ values higher than 0.2% is between 0.2 μm and 4 μm.

10. The optical fiber according to claim 8, wherein said multiple-pedestal region includes 6 or fewer pedestals with $\Delta_{ped}$ values higher than 0.2% and the total width of these pedestals with $\Delta_{ped}$ values higher than 0.2% is less than 15 μm.

11. The optical fiber according to claim 8, wherein said fiber has mode field diameter MFD between 6 μm and 8 μm at a wavelength of 1550 nm and a cut-off wavelength of no more than 980 nm.

12. The optical fiber of claim 8 wherein at least one of said pedestal corresponds to a region in said optical fiber that has Ge doping of 2 wt % to 17 wt %.

13. The optical fiber according to claim 8, said optical fiber having central core radius $Rc \leq 5$ μm.

14. The optical fiber according to claim 13, said optical fiber h having central core radius 0.8 μm.$\leq Rc \leq 2.5$ μm.

15. An optical fiber comprising:
a central core having a relative refractive index delta $\Delta_C$,
a multi-pedestal region surrounding said core, said multi-pedestal region having an outer radius of less than 25 μm, said region having at least two pedestals, at least one of said pedestals having $\Delta_{ped}$ value higher than 0.2% and lower than $\Delta_C$ and a width less than 6 μm; and
another region in contact and surrounding said multi-pedestal region, said another region having a relative refractive index delta lower than that of any pedestal, said optical fiber having a taper ratio between 1.5 and 3 and the difference $LP_{01}$–$LP_{02}$, measured at $\lambda$=1550 nm, larger than 0.0019 μm$^{-1}$.

16. The optical fiber according to claim 15, wherein the difference $LP_{01}$–$LP_{02}$ is between 0.0019 μm$^{-1}$ and 0.003 μm$^{-1}$.

17. An optical fiber comprising:
a central core having a relative refractive index delta $\Delta_C$.
a multi-pedestal region surrounding said core, said multi-pedestal region having an outer radius of less than 25 μm, said region having at least two pedestals, at least one of said pedestals having $\Delta_{ped}$ value higher than 0.2% and lower than $\Delta_C$ and a width less than 6 μm; and
another region in contact and surrounding said multi-pedestal region, said another region having a relative refractive index delta lower than that of any pedestal, said optical fiber having (i) a taper ratio between 1.5 and 3; and (ii) non-adiabatic taper induced loss of less than 0.1 dB.

18. The optical fiber according to claim 17, wherein the non-adiabatic taper induced loss is less than 0.06 dB.

19. An optical coupler including at least one fiber comprising
a central core having a relative refractive index delta $\Delta_C$.
a multi-pedestal region in contact with and surrounding said core, said multi-pedestal region having an outer radius of less than 25 μm and at least two pedestals, each of said pedestals being in contact with and adjacent to at least one other pedestal, each of said pedestals having a relative refractive index delta $\Delta_{ped}$ lower than $\Delta_C$, at least one of said pedestals having $\Delta_{ped}$ value higher than 0.2% and a width of less than 6 μm and another one of said pedestals having $\Delta_{ped}$ value lower than 0.2%; and
another region in contact and surrounding said multi-pedestal region, said another region having relative refractive index delta which is lower than that of any pedestal, said optical fiber having a taper ratio between 1.5 and 4, wherein taper ratio is the ratio between fiber diameter at a non-tapered region and fiber diameter at the narrowest, tapered region.

20. An optical coupler including at least one fiber of claim 19, said optical fiber having a taper ratio between 1.5 and 3.

* * * * *